Figure 1:
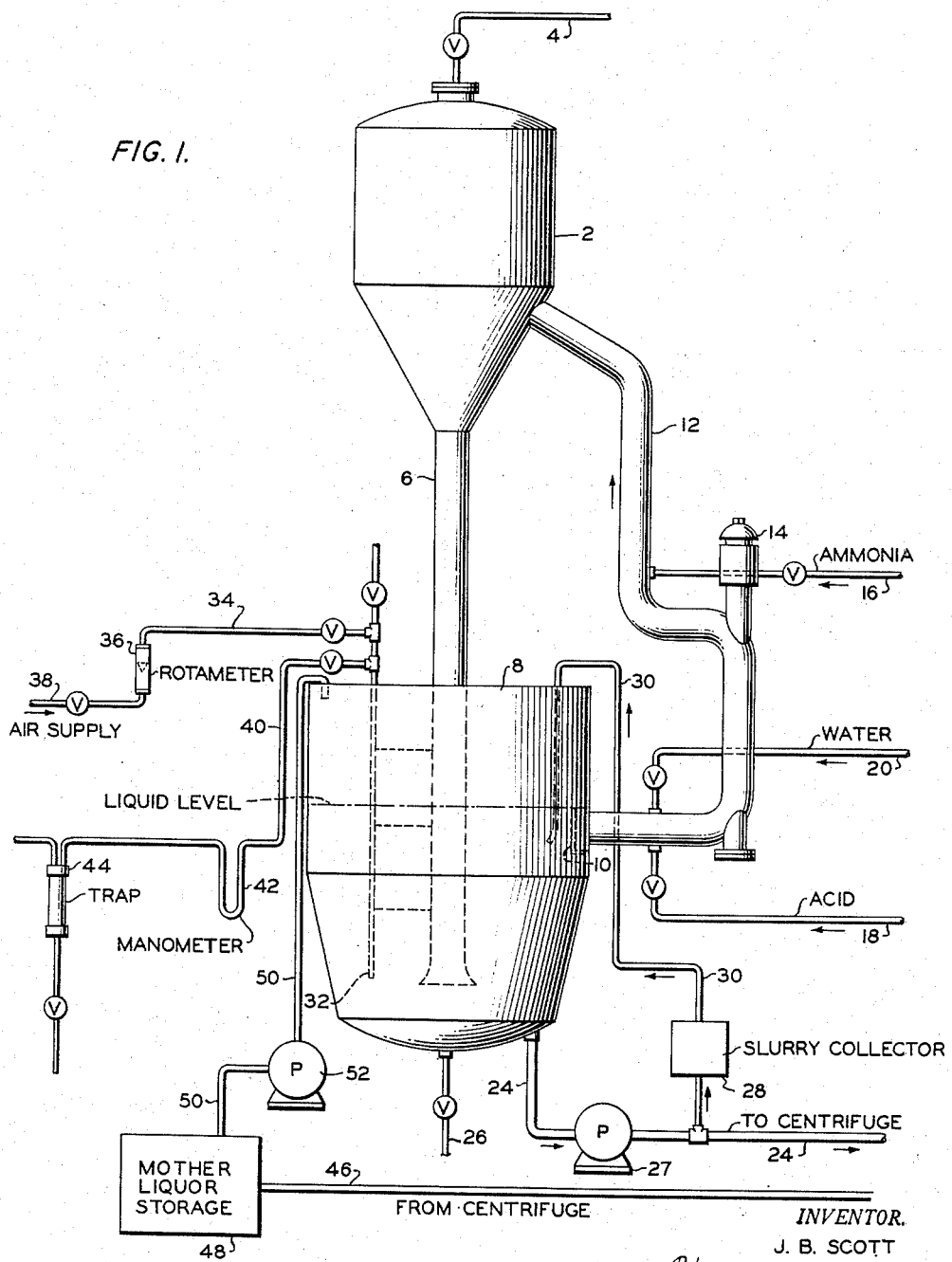

Aug. 6, 1957 — J. B. SCOTT — 2,801,907
PROCESS FOR THE MANUFACTURE OF CRYSTALS OF UNIFORM SIZE
Filed Jan. 2, 1952 — 2 Sheets-Sheet 1

CUMULATIVE SCREEN ANALYSES

CUMULATIVE SCREEN ANALYSES

United States Patent Office 2,801,907
Patented Aug. 6, 1957

2,801,907
PROCESS FOR THE MANUFACTURE OF CRYSTALS OF UNIFORM SIZE

John B. Scott, Pasadena, Tex., assignor to Phillips Petroleum Company, a corporation of Delaware Application January 2, 1952, Serial No. 264,504

2 Claims. (Cl. 23—295)

This invention relates to the production of crystals of crystallizable materials. In one of its more specific aspects it relates to the production of crystals of organic and inorganic compounds. In a still more specific aspect it relates to the manufacture of crystalline materials of uniform size. In one specific embodiment this invention relates to improved crystallizer operation for producing crystals of ammonium salts such as ammonium sulfate, ammonium nitrate, etc.

In the art of crystallization many processes and apparatus have been developed in attempts to improve the quality of crystalline materials obtainable. Of the crystallization units thus produced there are those which manufacture crystals by the evaporation of a solvent from the crystallizable material. Of these apparatus, the Oslo or Krystal types of evaporative crystallizers have been used with particular advantage and it is with an improved process for operating such evaporative crystallizers that this invention deals. In operating such an apparatus, a solution of a material to be crystallized or reactants forming a solution of a crystallizable material are introduced to the evaporative crystallizer in such a manner that they pass first through the evaporation zone where the solvent is removed usually by a reduction in pressure along with moderate heating. Heating is used particularly when reactants are introduced to the crystallizer which give off a heat of reaction during the formation of the crystallizable material. Such an apparatus can also be operated by utilizing reduction in pressure and cooling, however this is usually considerably more expensive, inasmuch as suitable refrigeration equipment must be supplied. By these methods of evaporation of the solvent the solution of crystallizable material becomes concentrated to such an extent that the degree of saturation passes through the metastable region thus causing initial crystal nuclei to form. Following such nucleation the saturation of the mother liquor, as it is called, is maintained such that a minimum of new crystal nuclei will be formed and the crystal nuclei present will be allowed to grow to within a suitable size range. When the crystals have reached the desired size, which in many cases may not be controlled with any great degree of accuracy, the crystals are continuously withdrawn from the crystallization zone in the form of a crystal magma which comprises a mixture of solid crystals and saturated mother liquor. The thus withdrawn magma is then passed to suitable separation equipment such as centrifuges, settlers, thickeners, and the like.

Of the crystallizers referred to in this specification or modifications thereof, which can be used to advantage suitable examples are found in the "Chemical Engineers Handbook," pages 1792–3, second edition, 6th Impression, edited by John H. Perry and printed by the McGraw-Hill Book Company, Inc.; or in the following co-pending applications: Serial No. 97,467, filed June 6 1949, of G. W. McCullough, now Patent 2,671,652, and Serial No. 112,589, filed August 26, 1949, of Worth Gray now Patent 2,623,814.

In the production of crystals of ammonium sulfate and the like it is desirable to produce crystals of relatively large size and as uniform in size distribution as possible within an economic time limit. It has been found that a desirable manner to accomplish this end is to feed and maintain only a limited number of small crystals along with a solution whose concentration has been established in the metastable range of supersaturation.

Look glasses have been installed in the crystallizer as one means of determining the size distribution of crystals in the crystallizer, but these have proven to be of little value, because the interpretation of what one sees through the look glasses is hazardous and at best only a guess based on experience. The look glasses still do not lead to the maintenance of proper control of the crystallizer because: considerable operator time is required; the quality of product is measured after the damage is done; and look glasses are sensitive only to major variations in operating conditions.

It is an object of this invention to provide a method for the control of crystal size in the production of crystalline materials.

Another object of this invention is to provide a continuous, instantaneous method for the quantitative determination of weight of crystals in a crystallizer which averts the production of non-uniform crystal products and which requires a minimum of the operators time.

A further object of the instant invention is to produce, in an economically feasible time interval, a crystalline ammonium sulfate product having a large percentage of crystals of a desired size characterized by being relatively free of fines.

Other objects and advantages of the invention will be apparent to one skilled in the art from the following discussion and disclosure.

This invention is based upon my discovery that crystal size is a function of the weight of crystals in a crystallizer. Although crystal residence time is a direct function of the feed rate and the amount of crystals in the crystallizer, it has been found that there can be a large variation in crystal residence time with little effect upon crystal size. However I have now found that for each production rate there is a minimum tonnage of crystals that should be maintained in the suspension vessel or crystallizer for a given crystal size. More crystal surface is required to relieve the supersaturation when operating at high production rates than when operating at low production rates. A superior crystalline product can thus be obtained by inhibiting the formation of newly formed nuclei in the crystallizer and by controlling the number of crystal nuclei present upon which to remove the saturation. Hence, for a given feed rate, which may be established by economic factors, accurate control of crystal size can be attained in accordance with this invention by knowing the total crystal tonnage in the crystallizer and adjusting other operating variables to maintain the tonnage at a constant value. Thus in accordance with an embodiment of this invention whenever measured weight of liquid suspension or of crystals in the crystallizer changes to an undesired extent from a predetermined value or range of values the rate of introduction of crystallizable material to the crystallizer can be changed to maintain constant a predetermined optimum weight of crystals or of liquid suspension in the crystallizer commensurate with a desired crystal size. Alternatively the rate of withdrawal of crystallized material rather than rate of introduction of crystallizable material can be changed.

In accordance with one aspect of this invention, therefore, in an evaporative crystallization process of the Oslo type I have provided a method for the production of crystalline product of uniform crystal size containing a minimum of fines by ascertaining the density of liquid suspension in the crystallizer in order to calculate the weight of crystals, measuring crystal sizes of product obtained by operating at various known densities, thus correlating the weight of crystals in the crystallizer with the crystal size of product to find the optimum density commensurate with a desired crystal size and controlling the rate of withdrawal of product from the crystallizer and the rate of introduction of crystallizable material to the crystallizer to maintain constant the optimum density of the liquid in the crystallizer.

The following discussion in conjunction with the attached drawings will serve to exemplify my invention and more specifically disclose the process thereof.

In Figure 1, shown in elevation, is one form of apparatus used in crystal formation. As is apparent from a comparison of the drawing of Figure 1 and the evaporative crystallizers referred to hereinbefore, the apparatus shown in Figure 1 is a modification of the Oslo type of crystallizer.

Figure 2:
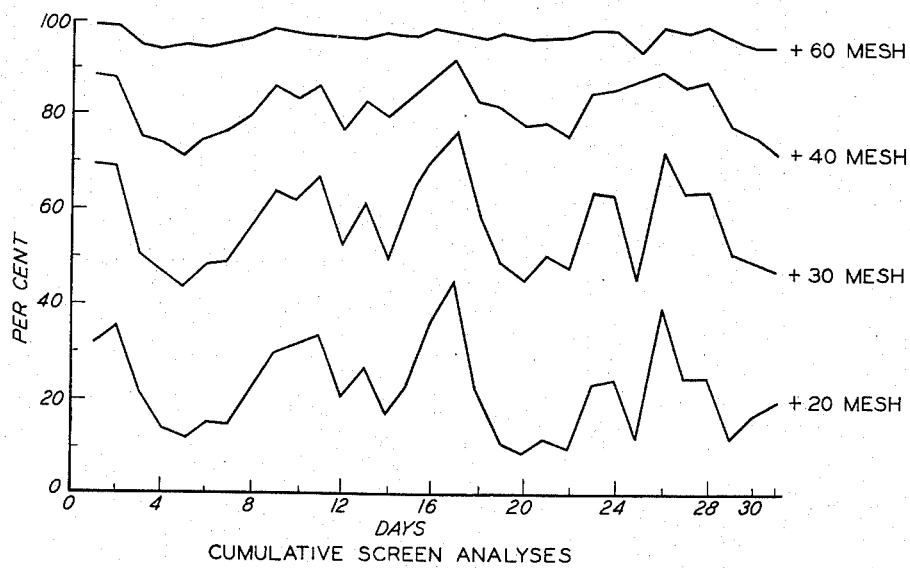
Figure 3:
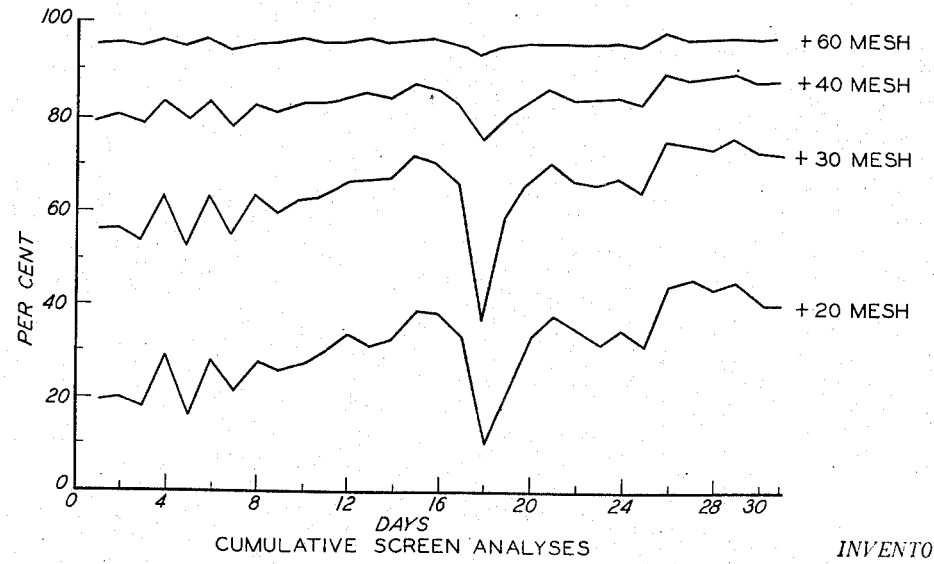

Figures 2 and 3 are graphs showing cumulative screen analyses before and after use of the instant invention.

Although the discussion is limited to a process for the manufacture of ammonium sulfate by direct neutralization of sulfuric acid with ammonia, this is done merely to make my invention more clear and should not be interpreted as an undue limitation upon my overall process. My process can also be applied with utility to the production, recrystallization, or crystallization from waste liquors and the like of numerous organic or inorganic crystallizable materials, e. g. adipic acid, ammonium nitrate, diammonium phosphate, sodium chloride, citric acid, hydroquinone, zinc sulfate, potassium nitrate, oxalic acid, potassium sulfate, sodium sulfate, tartaric acid, potassium nickel sulfate, potassium bicarbonate, copper sulfate, and many other organic and inorganic materials of crystalline nature.

Referring now to Figure 1, which represents one specific embodiment of my invention, numeral 2 is an evaporation zone for removing water from an ammonium sulfate containing liquor so as to supersaturate the liquor and remove the heats of reaction and crystallization. This particular evaporator can be operated at subatmospheric pressure by the use of a barometric condenser, not shown, wherein water vapor is removed and condensed. Uncondensed gases, such as air, are removed from the condenser by means of an aspirator through which steam, as the aspirant, is passed.

The liquor which is concentrated to supersaturation in evaporation zone 2 is passed therefrom by means of conduit 6 which is a barometric leg extending down into crystallizer 8 to a point near the bottom thereof. In this manner, the supersaturated ammonium sulfate solution or solution of other crystallizable material contacts the suspension of crystals in and near the bottom of the crystallizer causing them to grow rather than forming new crystals and thus relieveing the supersaturation of the liquor. As the crystals grow they become heavier and settle towards the bottom of the crystallizer, the heaviest crystals settling fastest. The liquor after passing through the suspension of crystals is saturated and is relatively free of crytals. This liquor is withdrawn over weir 10 and through conduit 12 by means of pump 14 and is passed back to evaporation zone 2 where it again becomes supersaturated.

As indicated hereinbefore, in the practice of this invention the weight or density of the liquid suspension in the crystallizer is determined and this weight is used to control crystal size. One desirable method of determining the density or weight of the liquid suspension in the crystallizer is by the use of tube 32, pressure indicator 42 and air supply 38 as will be described hereinafter.

In the particular embodiment of my invention shown in Figure 1 the crystallizable material is produced within the evaporative crystallization apparatus, however this is not a prerequisite of my invention. The crystallizable material can be made outside of the crystallization apparatus in any manner desired and the scope of my invention is intended to be broad enough to cover this aspect. Referring back to the drawing again, sulfuric acid and water are introduced to conduit 12 below pump 14 via lines 18 and 20 respectively. The water is supplied to remove the heats of reaction and crystallization generated by the direct neutralization of ammonia and acid and by the formation of crystals. Ammonia to be reacted with the sulfuric acid is introduced to line 12 above pump 14 by means of line 16. Any suitable means for distributing the ammonia evenly throughout the liquor passing upward through conduit 12 can be used. For example, the sparging apparatus of co-pending application Serial No. 97,467 can be used with success or the sparging device of co-pending application Serial No. 114,160, filed September 6, 1949, of R. K. Simms, now Patent 2,673,078, can also be used with utility. By continuously introducing reactants or a solution of crystallizable material the process of crystallization is maintained continuous. Numeral 26 indicates a drain in the bottom of the crystallization apparatus.

Crystal magma, i. e., a suspension of crystals in mother liquor is withdrawn from the crystallization zone 8 through conduit 24 and pump 27. Line 30 is provided for returning crystal magma into the top of the crystallization zone, for example when it has been found that the crystals have been reduced in size due to attrition within the circulating line 24 and pump 27. Slurry collector 28 will also contain small crystals which accumulate in other parts of the plant. The desired quantity of magma to be separated is withdrawn through line 24 and is passed therefrom to centrifuge or other separating equipment. Suitable controls for regulating the flow of magma through line 24 such as valves and the like are used in controlling the flow of the thus withdrawn magma. Separated crystals, as of ammonium sulfate, are withdrawn from the centrifuge and are handled as desired. Mother liquor is removed from the centrifuge via line 46 and is returned to the crystallization zone. Often the liquor is passed to a storage unit such as mother liquor storage 48 from which it is passed via line 50 and pump 52 to the crystallization zone as desired to keep a constant liquid level. Also if desired lines can be provided as overflow and emergency lines leading from the crystallization zone of the evaporative crystallizer to the mother liquor storage tank.

As noted heretofore one desirable method of operating in accordance with this invention is to weigh the liquid suspension in the crystallizer by means of the apparatus shown in Figure 1 of the accompanying drawing. In this embodiment the slurry in the vessel is maintained at a constant level by drawing off liquor relatively free of crystals at weir 10. Make-up slurry is added through line 30 and ammonium sulfate solution, supersaturated to the metastable range, enters through pipe 6 from upper evaporator or concentrator 2. Air introduced through line 38 at a fixed rate and measured by rotometer 36, or other metering device, is conducted to pipe 32 by way of line 34. Pipe 32 extends through the top of vessel 8 to the bottom of the effective zone of crystallization. When the air pressure in the pipe 32 very slightly exceeds the pressure differential between the top of the ammonium sulfate slurry and the pressure at the bottom of pipe 32, air leaves the open bottom end of pipe 32, bubbles through the solution and escapes through an annular space, not shown, between the pipe 6 and the neck of vessel 8. The air pressure is measured by means of manometer 42. A trap 44 is attached to the atmospheric side of the manometer 42 for the purpose of retaining the manometer fluid in event of excessive pressure surge. Since the slurry level in the suspension vessel 8, and hence, the volume of slurry is fixed, the density or weight of crystals in the crystallizer can be readily calculated, from the pressure indicated on manometer 42. In effect the weight of liquid suspension, i. e., liquid containing crystals in suspension, in the crystallizer is balanced against a known weight indicated by the manometer or other pressure indicating instrument. Thus, in operating in accordance with the practice of this invention the process is first put onstream by any one of the well known methods, for example seeding, etc. After a sufficient number of crystals has formed the crystal tonnage is established by allowing the crystals to grow to a pre-established rate determined for the desired crystal size. The tonnage is then kept at a constant value for this desired crystal size. If the weight of the crystals is below the desired crystal tonnage value the flow of slurry can be decreased or the amount of supersaturated liquid introduced from the evaporator can be increased. If the weight of the crystals is above the desired weight for the given crystal size the flow of slurry can be increased.

The practicality of this invention has been demonstrated by installing a weight determining device shown in Fig. 1 on the suspension vessel of a commercial ammonium sulfate crystallizer. Figures 2 and 3 of the accompanying drawings show the daily cumulative screen analysis of product at the plant for periods of one month each. Figure 2 shows the random distribution of particle size during a typical month before the crystallizer was operating in accordance with this invention. Figure 3 shows the relatively smooth product control attained after the crystallizer was operated in accordance with the instant invention. The one day production shown out of control, Figure 3, the 18th day, was caused by water leaking into the suspension vessel during a shutdown. The crystals were dissolved by the excess water which accounts for the small crystals produced on that day.

In order to illustrate further the relationship of crystal tonnage or crystal weight to crystal size the following table is given:

Table

|  | Average Daily Crystal Tonnage | U. S. Sieve Size | Average Wt. Percent | Production, Tons |
|---|---|---|---|---|
| 1st Day | 31 | +10<br>+20−10<br>+30−20<br>+40−30<br>+60−40<br>+80−60<br>+100−80<br>−100 | 0.9<br>30.7<br>33.3<br>19.1<br>12.3<br>2.3<br>0.9<br>0.4 | 561 |
| 2nd Day | 29.8 | +10<br>+20−10<br>+30−20<br>+40−30<br>+60−40<br>+80−60<br>+100−80<br>−100 | 0.6<br>43.7<br>31.6<br>14.0<br>7.9<br>1.4<br>0.6<br>0.2 | 485 |
| 3rd Day | 27 | +10<br>−10+20<br>−20+30<br>−30+40<br>−40+60<br>−60+80<br>−80+100<br>−100 | 1.3<br>45.1<br>28.6<br>14.0<br>8.5<br>1.7<br>0.5<br>0.2 | 626 |
| 4th Day | 24 | +10<br>−10+20<br>−20+30<br>−30+40<br>−40+60<br>−60+80<br>−80+100<br>−100 | 0.6<br>43.5<br>30.5<br>14.9<br>8.3<br>1.5<br>0.4<br>0.3 | 622 |
| 5th Day | 21 | +10<br>−10+20<br>−20+30<br>−30+40<br>−40+60<br>−60+80<br>−80+100<br>−100 | 0.7<br>44.8<br>30.7<br>14.0<br>7.6<br>1.3<br>0.4<br>0.5 | 630 |

The preceding table shows that when the crystal tonnage is kept between about 20 and about 30 the greatest percentage of crystals formed is larger than 30 mesh. The table shows also that when the crystal tonnage is below 30 a greater percentage of crystals is larger than 20 mesh (but smaller than 10) are produced. At a tonnage above 30 a greater percentage of crystals are smaller than 20 mesh (but larger than 30).

Thus I have found that by operating in accordance with this invention a crystalline product having a higher percentage of crystals larger than 20 mesh is obtained. In addition I have found that the product obtained in accordance with this invention is not only relatively free of fines but has a high resistance to caking during storage. Variations and modifications, particularly in the crystallization process to which the invention can be adapted, will obviously occur to those skilled in the art.

I claim:

1. In the art of producing crystals, the steps which consist in maintaining a suspension of crystals in an aqueous mother liquor, continuously withdrawing liquor from said suspension, continuously introducing into said suspension a supersaturated solution of the material from which the crystals are formed, thereby to provide additional crystals in the suspension, continuously withdrawing a stream of crystals from said suspension, introducing a stream of air under pressure into said suspension, varying said pressure until it is just sufficient to cause air to bubble through the suspension, whereby said pressure is directly proportional to the weight of said suspension, measuring said pressure, and varying the amount of crystals withdrawn from said suspension to maintain said pressure at a substantially constant value.

2. In the art of producing crystals, the steps which consist in maintaining a suspension of crystals in an aqueous mother liquor, continuously withdrawing liquor from said suspension, adding feed material to the withdrawn liquor to increase the concentration of crystallizable material therein, evaporating water from the liquor thus reinforced in crystallizable material to provide a supersaturated solution, introducing the supersaturated solution into said suspension to provide additional crytsals, withdrawing a stream of crystals from said suspension, recycling a portion of said stream of crystals to said suspension, recovering the remainder of said stream of crystals as a product, introducing a stream of air under pressure into said suspension, varying said pressure until it is just sufficient to cause air to bubble through said suspension, whereby said pressure is directly proportional to the weight of said suspension, measuring said pressure, decreasing the amount of crystals recycled to said suspension when said pressure exceeds a predetermined value, and increasing the amount of crystals recycled to said suspension when said pressure falls below a predetermined value.

References Cited in the file of this patent
UNITED STATES PATENTS

| 1,704,611 | Jeremiassen | Mar. 5, 1929 |
| 1,976,936 | Harms | Oct. 16, 1934 |
| 2,037,595 | Schaefer | Apr. 14, 1936 |
| 2,091,898 | Weber | Aug. 31, 1937 |
| 2,288,667 | Allen | July 7, 1942 |
| 2,594,723 | Berteaux | Apr. 29, 1952 |
| 2,599,067 | Otto | June 3, 1952 |

OTHER REFERENCES

Taggart: Handbook of Mineral Dressing, John Wiley, N. Y., 1945, pages 8–60, 8–61.

Eckman: "Industrial Instrumentation," J. Wiley and Son, N. Y., 1950 pages 259–260.

Taggart: "Handbook of Mineral Dressing," J. Wiley and Son, N. Y., 1945, pages 8–22, 8–27, 8–28.